United States Patent [19]

Froeschke

[11] Patent Number: 5,232,128
[45] Date of Patent: Aug. 3, 1993

[54] APPARATUS FOR DEPOSITING PIECES OF FLOWABLE MATERIAL ONTO A TRANSPORT BELT

[75] Inventor: Reinhard Froeschke, Weinstadt-Beutelsbach, Fed. Rep. of Germany

[73] Assignee: Santrade Ltd., Lucerne, Switzerland

[21] Appl. No.: 882,905

[22] Filed: May 14, 1992

[30] Foreign Application Priority Data

Jun. 9, 1991 [DE] Fed. Rep. of Germany ... P4119021.1

[51] Int. Cl.$^5$ .............................................. A01J 21/00
[52] U.S. Cl. .................................. 222/109; 222/318; 222/424; 425/8; 425/382.3; 425/225; 425/DIG. 230
[58] Field of Search ................ 222/108, 109, 111, 318, 222/403, 420, 423, 424; 118/70; 425/8.225, 229, 230, 382.3, DIG. 230

[56] References Cited

U.S. PATENT DOCUMENTS

| | | | |
|---|---|---|---|
| 817,834 | 4/1906 | Bronder | 222/109 |
| 2,555,437 | 6/1951 | Edwards | 222/109 |
| 3,700,142 | 10/1972 | Waibel | 222/109 |
| 3,976,119 | 8/1976 | Miller | 118/70 |
| 3,996,888 | 12/1976 | Lofdahl et al. | 118/70 |
| 4,110,029 | 8/1978 | Goshima et al. | 222/109 |
| 4,279,579 | 7/1981 | Froeschke | 425/382.3 |
| 4,480,582 | 11/1984 | Schaefer | 118/70 |
| 4,578,021 | 3/1986 | Schermutzki | 425/382.3 |
| 4,610,615 | 9/1986 | Freschke | 425/8 |

Primary Examiner—Robert P. Olszewski
Assistant Examiner—Steven M. Reiss
Attorney, Agent, or Firm—Burns, Doane, Swecker & Mathis

[57] ABSTRACT

A rotary drum assembly contains a flowable material and includes peripheral openings through which the material can flow to form pieces of the material on a belt traveling beneath the drum assembly. A guide contacts the outer periphery of the drum assembly for pressing residual material back into the openings. The guide can be pivoted away from the drum assembly for servicing, and can be adjusted to different positions around the circumference of the drum assembly.

17 Claims, 2 Drawing Sheets

APPARATUS FOR DEPOSITING PIECES OF FLOWABLE MATERIAL ONTO A TRANSPORT BELT

BACKGROUND OF THE INVENTION

The invention relates to an arrangement for the depositing of flowable masses in the shape of drops or strips onto a transport belt traveling therebeneath.

These types of arrangements are known from German Patent Documents DE 28 53 054 and DE 29 41 802 and are preferably used for the production of granulates or tablets. For this purpose, the material may be heated and fed under pressure to the interior of a cylindrical container. The transport belt may be driven, and an exterior drum set into rotation in such a manner that the circumferential area of the drum facing the transport belt moves in the same direction as the belt. As soon as the openings of the rotating drum are congruent with those of the interior cylindrical container, a strip or drop of the viscous mass is pressed through the openings and falls onto the transport belt situated underneath. There, the individual pieces solidify, possibly promoted by a cooling of the transport belt, and may be taken off the belt in the form of granulates or tablets.

In order to keep the drum free of residual material that has protruded from the drum but has not dropped off, and to avoid resulting operating disturbances, guides are provided which surround the drum in such a manner that a narrowing gap is formed between the guide and the drum which narrows continuously in the rotating direction. The guide therefore carries out the function of pressing the residual material back into the openings on the drum. That material will later be dispensed when the respective openings become congruent again with the openings of the interior container. Such a guide renders a scrape-off device superfluous and, in comparison to such a scrape-off device, has the advantage of recycling the residual material in a manner which is simple and ensures that the material will not be wasted.

In the known arrangements, the mounting of the guide takes place in a rigid yet detachable manner by means of a fastening rod or angle brackets which, as a rule, are mounted above the transport belt and above the drops carried on the belt. The vapors rising from the drops may condense on the fastening parts and lead to an impairment of the mounting function.

It is an object of the invention to provide an arrangement of the afore-mentioned type where the parts are arranged in a manner that is advantageous with respect to maintenance and servicing.

SUMMARY OF THE INVENTION

This object is achieved by an apparatus for depositing pieces of a flowable mass onto a transport belt. The apparatus comprises outer and inner containers. The outer container is cylindrical, and the inner container is arranged inside the outer container. The outer container is rotatable relative to the inner container and has a first opening which becomes aligned with a second opening of the inner container to enable a flowable mass contained in the inner container to flow downwardly onto a transport belt. A guide is positionable in an operative position adjacent an outer periphery of the outer container for pressing residual mass back into the first opening as the outer drum rotates relative to the guide. The guide is mounted to a carrier for displacement of the guide away from the outer container to a servicing position in a direction transversely of a longitudinal axis of the container.

The fact that the guide can be displaced away from the outer container facilitates the accessibility of the guide as well as of the area of the outer container that is covered by the guide in the operative position. A high-expenditure loosening of fastening screws as well as a difficult adjusting when the guide is remounted and is therefore avoided, for example, for servicing and cleaning operations.

In a further development of the invention, the guide is connected with a holding arm which is pivotally connected at one end to the carrier. Preferably, the pivot is arranged in an area laterally of the transport belt and extends perpendicularly with respect to the axis of the container assembly.

The guide is displaced from an area above the transport belt into an area laterally of the belt which again very much facilitates access to the guide. It is advantageous for the guide to be lockable in the servicing position, preferably by means of an automatic lock.

The carrier is preferably rotatably movable about the axis of the outer container by way of a ring. As a result, the position of the guide can easily be adjusted in the circumferential direction of the outer container.

Preferably, the guide is mounted on a swingable arm, and the arm carries a spur which can be inserted into a recess formed in an end face of the outer container. Thus, the guide can be locked in a precise and simple manner with respect to the drum assembly by means of the spur.

Preferably, the guide is movable relative to the arm in a direction toward and away from the outer container. The guide is connected to a lever mechanism extending between the arm and the guide so that the movement of the guide relative to the arm can be effected by an operator standing alongside the transport belt.

Preferably, the lever mechanism is spring-biased in a direction displacing the guide toward the outer container relative to the arm. Thus, when the front face of the guide which contacts the outer container becomes worn, the spring will automatically push the guide against the outer container to compensate for such wear. A stop is provided for limiting movement of the guide toward and away from the outer container. When guide has been excessively worn, the stop will prevent proper contact between the guide and the outer container, thereby providing an indication of the excessive wear.

The arm carries a swivel grip to enable an operator to displace the arm and guide to the servicing position.

The carrier is located upstream of the outer container with reference to the direction of belt travel, so as to be isolated from any harmful vapors emanating from the pieces of mass which have fallen onto the belt.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
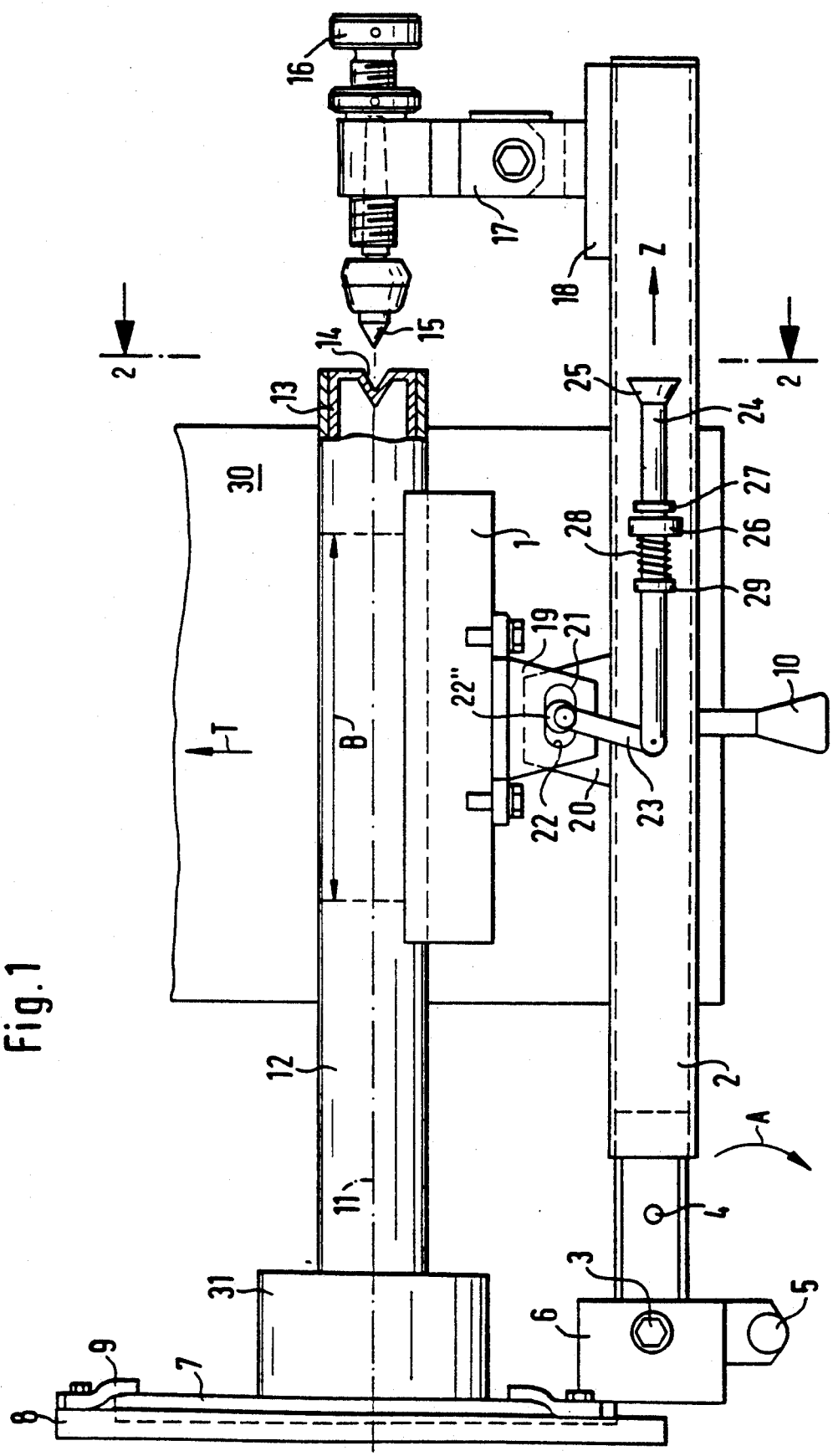
FIG. 1 is a top view of a granulating or tablet-producing arrangement according to the present invention comprising a guide which is arranged on a pivotal holding arm and is associated with a drum arranged transversely with respect to a transport belt.
Figure 2:
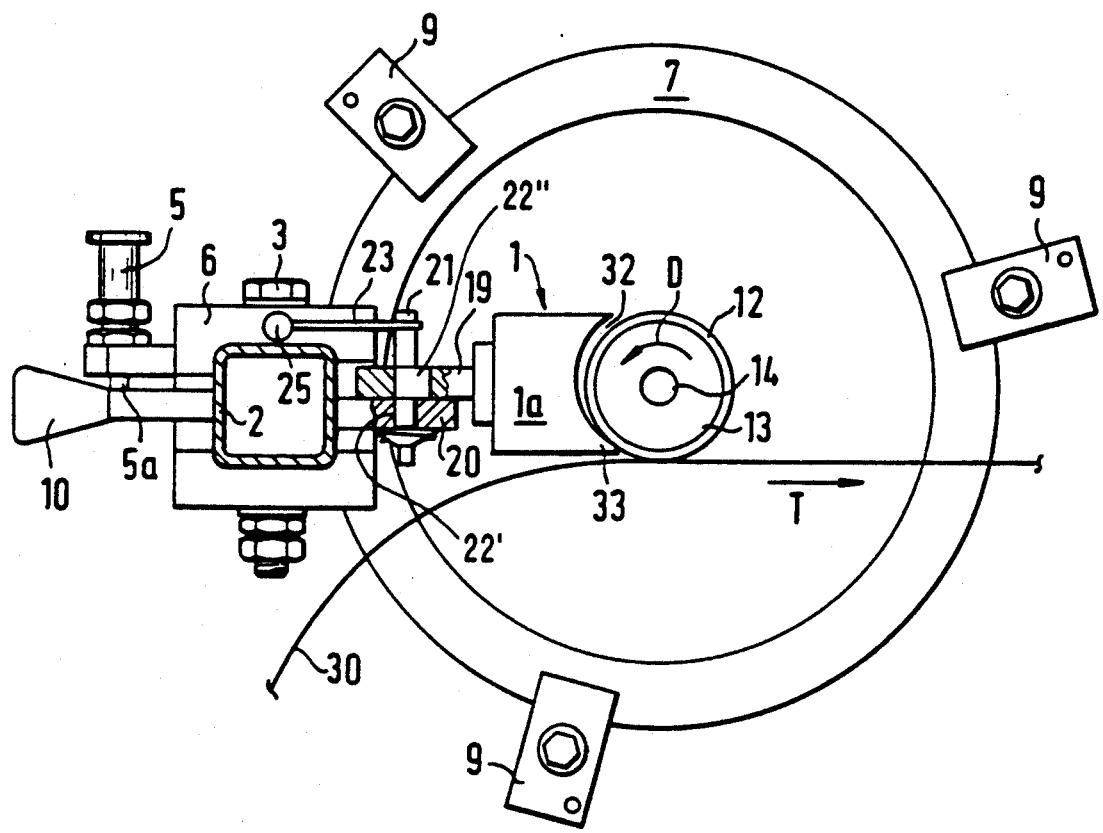
FIG. 2 is a sectional view taken along line 2—2 of FIG. 1.

The arrangement illustrated in FIGS. 1 and 2 is used for the manufacturing of granulates or tablets. The material is deposited as individual pieces, for example, drops or strips, on a transport belt 30 and moved in the direction of the arrow T. Closely above the belt and downstream of an end or turn-around area of the belt, a drum 13 is arranged for depositing the viscous mass, the axis of rotation 11 of the drum 13 extending horizontally and transversely to the moving direction of the belt T. In a conventional manner, the drum 13 has on a section B of its shell surface, openings which are not shown in detail and through which the mass can flow (i.e., by gravity) and fall upon the transport belt.

Inside the drum 12, another drum 13 is arranged coaxially and defines a cylindrical container, the mass being fed to the interior of this container. The feeding takes place by way of feeding pipes which are housed in a housing 31, along with a bearing and the drive for the drum 12. That drive rotates the drum 12 relative to the stationary interior drum 13. As is also customary, the interior stationary drum 13 has openings in its circumference, which openings face the transport belt 30 and are arranged in a row. The length of the row corresponds to the axial extent of the drum shell area B of the exterior drum 12 which is provided with openings, the openings extending around the circumference of drum 12.

While the mass under pressure is fed to the interior of the stationary drum 13, the exterior drum 12 rotates during the operation in a rotating direction D such that the circumferential speed of the portion of the drum which faces the transport belt 30 is approximately equal to the belt speed. The interior drum 13 does not absolutely have to constitute a cylinder or be symmetrical about its axis; it must be ensured, however, that the inner circumference of the rotating exterior drum 12 surrounds at close contact the outer circumference of the interior stationary drum 13 in the lower region facing the transport belt. This ensures that the mass is discharged onto the belt from the interior of the stationary drum through its underside openings and through the respective aligned corresponding openings of the rotating exterior drum without any gap being present between the aligned openings. This prevents the mass from spreading out between the walls of drums 12, 13.

Figure 2A:
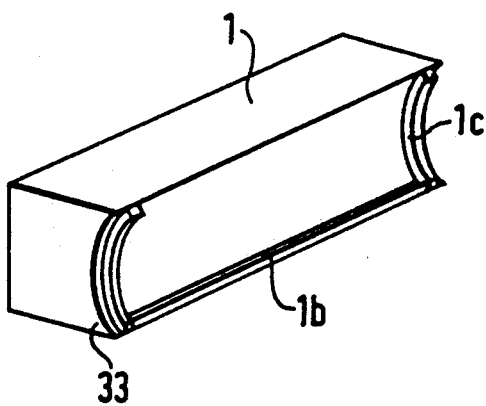
FIG. 2a is an enlarged perspective view of the side of the guide which rests against the drum.

Outside the area of the transport belt 30, a guide 1 is positioned adjacent the outer circumference of the rotating drum 12. The guide surrounds a portion of the drum circumference and extends axially slightly beyond the apertured portion B of the drum 12. The axial ends of the guide 1 are defined by side walls 1a. On its interior side which faces the drum 12 the guide 1 is provided with sealing strips 1b, 1c which rest against the drum circumference (FIG. 2a). The sealing strip 1b is assigned to a downstream end portion 33 of the guide (i.e., downstream with reference to the rotating direction D of the drum 12).

In the circumferential direction, the guide 1 surrounds the drum shell in such a manner that a gap 32 is formed between the front face of the guide and the drum shell which becomes increasingly narrow in the rotating direction D. The guide causes residual material (i.e., material that may not have dropped off onto the belt 30 but rather remains on the outer circumference of the rotating exterior drum 12) to be pressed back into the openings on the rotating drum 12. After leaving the region of the contacting guide portion 33, the rotating outer circumference of the drum is therefore completely free of such residual material so that an unimpaired new yield of material through the corresponding openings is possible.

In order to promote the pressing-back of the residual material into the openings of the rotating exterior drum 12 by a pressure effect, the gap space 32 between the guide 1 and the drum circumference is closed off, if possible, on all sides by the sealing strips 1b, 1c. It is difficult to access these sealing strips in the operative position of the guide 1. Since the sealing strips comprise, for example a plastic material, they must be replaced after a certain operating period. The guide 1 can therefore be radially swivelled away from the drum shell for such operations.

For this purpose, guide 1 is connected to a holding arm 2 which is pivotally connected to a carrier or holding device 6 so that it can be swivelled about one end by means of a swivel pin 3 which defines an axis of rotation of the guide. In the operative position, the holding arm 2, constructed as a square tube, is parallel to and offset from the drum axis 11, while the swivel pin 3 is situated in a plane oriented perpendicularly with respect to the drum axis of rotation 11. From this operating position, in which the guide 1 rests against the circumference of the drum, the holding arm 2 can be swivelled away from the drums 12, 13 by 90° in a direction of arrow A. The arm 2 is automatically locked in this swivelled-away servicing position by the locking of a spring-biased locking pin 5 of the holding device 6 in a bore 4 on the holding arm 2. The swiveling of the holding arm 2 together with the guide 1 is facilitated by a swivel grip 10 welded to the holding arm 2 which projects approximately in the center transversely on the side of the holding arm 2 opposite the guide 1. In the swivelled-away servicing position, the holding arm 2, together with the guide 1, is situated completely outside he transport belt area so that the corresponding parts, such as the sealing strips 1b, 1c, are easily accessible.

The holding arm 2 and the guide is disposed in an area which is situated on an upstream side of the drums or rotoformer 12, 13 (i.e., on a side thereof) facing away from the portion of the transport belt that is provided with the drops to be granulated. This has the advantage that the holding arm cannot be damaged by vapors which rise from the drops, in either the operating position or the swivelled-out position. The operability of the holding arm and of the contact pressure device for the guide is, however, maintained.

After the lifting of the locking pin 5, the holding arm 2 can be swivelled back into the operative position. For a precise adjusting, a spur holding device 17 is fastened by way of a flange 18 to the end of the holding arm 2 situated opposite the swivel pin 3. This spur holding device 17 carries a spur 15 which can be adjusted in its longitudinal direction. The axial displacement of the spur 15 takes place by means of a knurled screw 16. A fitted conical indentation 14 interacts with the spur 15 and is provided in the center of the facing end face of the stationary drum 13. The indentation 14 is situated on the end face of the stationary drum 13 which is situated opposite the housing 31 on which the stationary drum 13 is rotatably supported. After the swiveling of the holding arm 2 into its operative position extending parallel to the drums 12, 13, the spur 15 is inserted into the indentation 14 by means of the turning of the screw 16, so that the holding arm 2 is thereby precisely fixed with respect to the drums 12, 13. Before the holding arm 2 is swivelled away, the spur 15 must be guided out of the indentation 14.

The swivel holding device 6, which is situated on the same side of the transport belt 30 as the holding and bearing housing 31 is, in turn, fastened to a disk-shaped ring 7 which surrounds the housing 31 and which can be rotated about the drum axis 11. The ring 7 is guided in a recess of another housing part 8, and is fixable with respect to the latter by means of three tension elements 9 distributed uniformly on the circumference of the part 8. After the release of the tension elements 9, the ring 7, and therefore also the holding device 6, the holding arm 2 and the guide 1, can be rotated about the drum axis 11 and can be fixed again in another position. It is, therefore, possible to arrange the guide 1 in different circumferential area of the drum 12, as needed. The guide may, for example, be arranged at the top of the drum 12 diametrically opposite the transport belt 3.

When the guide 1 is to be swivelled-out to a servicing position, the guide should preferably be disposed in the position depicted in FIGS. 1 and 2. Thus, if the guide is disposed in some other position, the ring 7 should be released and then rotated about axis 11 until the guide 1 and arm 2 are located as indicated in FIGS. 1 and 2. Then, after the guiding-out of the spur 15, the arm 2, together with the guide 1, would be swiveled away toward the side. Since the drums 12, 13 are arranged at an end of the belt 30, the holding arm 2 and the guide 1, in the swiveled-away servicing position, are disposed in an area situated outside the transport belt area so that they are easily accessible from all sides.

By way of an eccentric bearing, the guide 1 is pivotally linked to the holding arm 2 so that it can be moved to a certain extent transversely with respect to the holding arm 2. For this purpose, a first bracket 20 is welded to the holding arm 2, and a second bracket 19, which partially covers this first bracket, is screwed or bolted to the guide 1. A slot 22 is situated in the second bracket 19, and a circular hole 22' is situated in the first bracket 20. A cylindrical bolt 21 is rotatably mounted in the hole 22' and includes an eccentric cam 22" which is disposed in the slot 22. A rotating of the bolt 21 therefore has the result that the second bracket 19, and thus the guide 1 connected with it, move transversely with respect to the second bracket 20 and arm 2 which remain stationary. The rotation of the bolt 21 is caused by way of a lever arm 23 and a connecting rod 24. The lever arm is pivotably mounted to the rod 24 and is affixed to the bolt 21.

Extending in the longitudinal direction, the connecting rod 24 is mounted on a side of the holding arm 2 by being guided through a passage of a bracket 26 welded laterally to the holding arm 2. A pressure spring 28 is inserted between the bracket 26 of the holding arm 2 and a stop 29 on the connecting rod 24 and presses the connecting rod 24 in the leftward direction in FIG. 1, whereby the guide 1 is pressed by the cam 22" away from the holding arm 2 and toward the drum shell. The guide portion 33 or the strips 1b, 1c resting against the circumference of the drum are thereby yieldably spring-biased against the rotating shell surface of the exterior drum 12. The guide 1 readjusts automatically by means of this expedient if the height of the sealing strip 1b, 1c contacting the drum, as a result of wear, decreases after a certain operating period.

The rod movement caused by the pressure spring 28 is limited by a stop 27 on the rod 24 which is situated opposite the pressure spring 28 on the other side of the flange 26. This limiting occurs, on the one hand, when the holding arm 2 is swivelled into the servicing position because then the guide 1 will no longer rest against the drum 12. When, on the other hand, also in the operating position of the holding arm 2 or of the guide 1 shown in FIGS. 1 and 2, the stop 27 strikes against the flange 26 of the holding arm 2, this is a signal that the sealing strips 1b, 1c of the guide 1 which are subject to wear are worn and must be replaced.

By a pulling on the front-face head 25 of the rod 24 in the shown direction of the arrow Z, an operator can pull the guide 1 slightly radially away from the drum 12 without having to swivel the holding arm 2. In case the guide is to be moved to another circumferential area of the drum 12 by the rotation of the ring 7, it may, instead of a completely swiveling of the holding arm 2, be sufficient to lift the guide 1 off the drum shell by the pulling of the rod 24 before the ring 7 is rotated.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus for depositing pieces of a flowable mass onto a transport belt, comprising:
    outer and inner containers, said outer container being cylindrical, and said inner container arranged inside said outer container, said outer container being rotatable relative to said inner container and having a first opening which becomes aligned with a second opening of said inner container to enable a flowable mass contained in said inner container to flow downwardly onto a transport belt,
    a guide positionable in an operative position adjacent an outer periphery of said outer container for pressing residual mass back into said first opening as said outer drum rotates relative to said guide, and
    a carrier to which said guide is mounted for displacement away from said outer container to a servicing position in a direction transversely of a longitudinal axis of said outer container.

2. Apparatus according to claim 1, wherein said guide is arranged on an upstream side of said outer drum with reference to a direction of belt travel, said displacement of said guide being in a horizontal upstream direction.

3. Apparatus according to claim 2, wherein said guide is situated adjacent an upstream end of said belt when in said operative position, so that subsequent to said displacement of said guide to said servicing position, access to said guide is unobstructed by said belt.

4. Apparatus according to claim 1, wherein said guide is pivotably mounted to said carrier for rotation about a substantially vertical axis, said outer drum being rotatable about a substantially horizontal axis.

5. Apparatus according to claim 1 including an arm to which said guide is mounted, said arm being pivotably mounted at one end to said carrier for displacing said guide, said arm extending generally parallel to said outer container when said guide is in said operative position.

6. Apparatus according to claim 5, wherein said arm extends generally perpendicular to said outer drum when said guide is in said servicing position.

7. Apparatus according to claim 5 including locking means for locking said arm when said guide is in said servicing position.

8. Apparatus according to claim 7, wherein said locking means comprises a spring-biased pin mounted on said carrier for automatically engaging a hole in said arm.

9. Apparatus according to claim 1 including a ring mounted for rotation about an axis coinciding with an axis of rotation of said outer container, said carrier being mounted on said ring to enable said guide to be adjusted around the circumference of said outer container.

10. Apparatus according to claim 5 including a spur mounted adjacent an end of said arm situated opposite said pivoted end thereof, said spur being insertable into an indentation formed in an end face of said outer container when said guide is in said operative position.

11. Apparatus according to claim 1 including an arm to which said guide is mounted, said arm being pivotably mounted to said carrier for displacing said guide between said operative and servicing positions, said guide being movable toward and away from said outer container relative to said arm.

12. Apparatus according to claim 11 including means for biasing said guide toward said outer container relative to said arm.

13. Apparatus according to claim 12, wherein said biasing means comprises a lever mechanism mounted on said arm and connected to said guide, and a spring biasing said lever mechanism in a direction for pressing said guide against said outer container.

14. Apparatus according to claim 13, wherein said lever mechanism comprises a rod slidably mounted on said arm, a bolt connected to said guide, and a lever arm pivotably connected at its ends to said bolt and said rod, respectively, such that longitudinal sliding of said rod produces rotation of said bolt, said bolt including a cam arranged to displace said guide relative to said arm in response to rotation of said bolt.

15. Apparatus according to claim 14 including a stop for limiting the extent of movement of said guide relative to said arm.

16. Apparatus according to claim 15, wherein said rod is spring-biased in a direction for moving said guide toward said outer container.

17. Apparatus according to claim 5 including a swivel grip mounted on said arm for enabling said arm to be manually swung.

* * * * *